United States Patent [19]

Twigge-Molecey

[11] 4,126,425
[45] Nov. 21, 1978

[54] GAS MIXER FOR SUBLIMATION PURPOSES

[75] Inventor: Christopher F. M. Twigge-Molecey, Toronto, Canada

[73] Assignee: Hatch Associates Ltd., Toronto, Canada

[21] Appl. No.: 801,542

[22] Filed: Jun. 15, 1977

[51] Int. Cl.² .............................................. B01D 7/02
[52] U.S. Cl. .................................. 23/294 R; 239/405; 423/601; 422/224
[58] Field of Search ............... 23/294, 264; 239/405; 366/336, 101; 423/659, 601

[56] References Cited

U.S. PATENT DOCUMENTS

| | | | |
|---|---|---|---|
| 1,642,756 | 9/1927 | Wedekind | 23/264 |
| 2,476,335 | 7/1949 | Tusson | 203/49 |
| 2,878,065 | 3/1959 | Watkins | 239/405 |
| 3,152,065 | 10/1964 | Shard et al. | 239/405 |
| 3,495,813 | 2/1970 | Marenghi et al. | 23/294 |

Primary Examiner—Hiram H. Bernstein
Attorney, Agent, or Firm—Ridout & Maybee

[57] ABSTRACT

A gas mixer is disclosed which is used for mixing different gases in order to obtain a solid by sublimation or chemical reaction. The mixing is carried out in a mixing chamber having a uniform, substantially circular, cross section and a length depending on the particular application. Build up of the solid is prevented by injecting the gases to be mixed into the mixing chamber so that the combined flow in the duct, at its inception, is characterized by an axial flow of one gas surrounded by a spiralling flow of another gas. Thus, the gases to be mixed will first meet in the vicinity of the center of the duct at what may be termed a shear layer and the shear layer will progressively spread outwardly to the mixer surfaces downstream of the point of injection of the gases into the mixing chamber. The bulk of the solid formation in the duct is in the vicinity of the center of the duct which prevents the formation of solid on or near the mixer surfaces where it would tend to adhere or deposit and cause build ups.

8 Claims, 4 Drawing Figures

GAS MIXER FOR SUBLIMATION PURPOSES

The invention relates to a gas mixer for mixing different gases in order to obtain a solid by sublimation or chemical reaction. The invention relates in particular to a gas mixer of special configuration wherein gaseous arsenic trioxide ($As_2O_3$) is mixed with ambient air to obtain solid arsenic trioxide by sublimation.

Conventional apparatus for mixing gases of different densities to generate a solid by sublimation or chemical reaction include mixing fans and baffle arrangements, such as disclosed in U.S. Pat. No. 1,642,756, issued on Sept. 20, 1927 to E. H. Wedekind. These arrangements have their own particular disadvantages. The main disadvantage is that the solids so formed are prone to build up on the mixer surfaces rapidly rendering the mixer inoperable and necessitating intensive maintenance. Additionally, mixing fans are subject to high first cost while baffle arrangements are subject to high operating pressure drops which represents high operating power costs. It is also known to inject the gases to be mixed coaxially into a pipe wherein the gases become fully mixed due to the turbulent motion of the flow. The problem with this latter apparatus is that, depending on the roughness of the pipe, the length of pipe required to achieve complete mixing is in the vicinity of one hundred pipe diameters and, accordingly, any given installation takes up considerable space. Furthermore, the generated solid tends to build up on the interior pipe surfaces.

The present invention avoids the problems inherent in the conventional mixing apparatus and especially those relating to build up of solid on the mixer surfaces. According to the present invention the mixing of gases of different densities is carried out in a mixing chamber having a uniform, substantially circular, cross section and a length depending on the particular application. Build up of the solid is prevented by injecting the gases to be mixed into the mixing chamber so that the combined flow in the duct, at its inception, is characterized by an axial flow of one gas surrounded by a spiralling flow of another gas. Thus, the gases to be mixed will first meet in the vicinity of the center of the duct at what may be termed a shear layer and the shear layer will progressively spread outwardly to the mixer surfaces downstream of the point of injection of the gases into the mixing chamber. Thus, the bulk of the solid formation in the duct is in the vicinity of the center of the duct which prevents the formation of solid on or near the mixer surfaces where it would tend to adhere or deposit and cause build ups. Build up of solid inside the duct is advantageously further prevented by vertically downwardly aligning the exhaust end portion of the duct so that the combined flow of the gas and solid in this portion of the duct is in a downward direction which prevents the formed solid from building up on horizontal surfaces.

The following description of a gas mixer of particular configuration suitable for sublimating gaseous arsenic trioxide is not intended to limit the configuration of any mixer embodying the invention but rather is an example of the flexible design available for any particular application.

A preferred embodiment of the invention is illustrated in the accompanying drawings in which.

Figure 1:
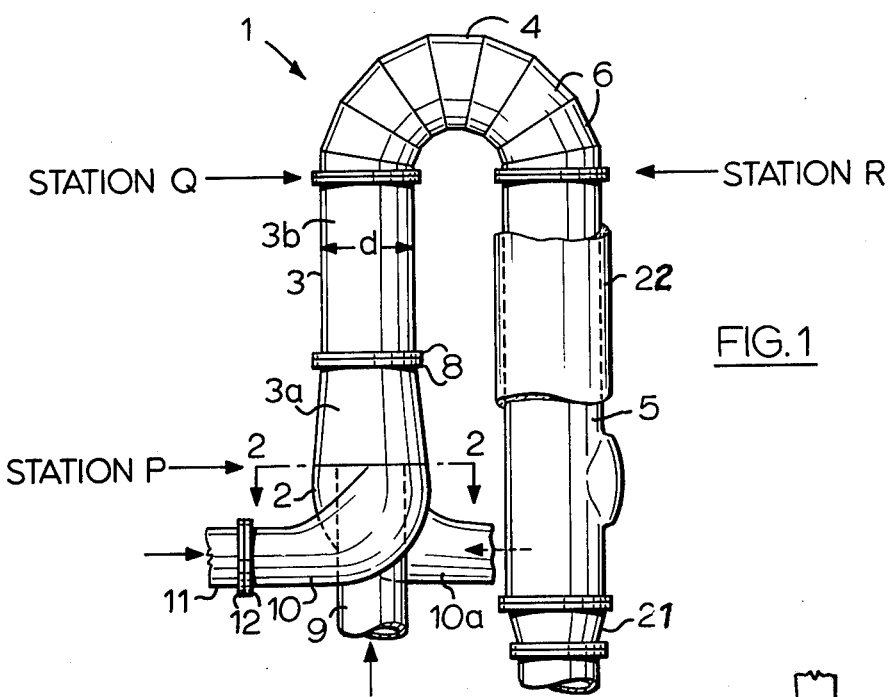
FIG. 1 is a view in side elevation of a gas mixer showing the mixing duct and the gas delivery nozzle assembly.

Referring to FIG. 1, the gas mixer illustrated comprises a mixing chamber, generally indicated by reference numeral 1, and a gas delivery nozzle assembly 2 arranged to impart a predetermined directional relationship to the different gases entering the mixing chamber. The mixing chamber 1 has an inlet section 3, a middle section 4 and an exhaust section 5. In the particular configuration shown in FIG. 1, the inlet section has two portions 3a and 3b connected by flanges 8. The middle section 4 has a 180° bend and is formed in portions 6 which may be welded together to form the bend. The mixing chamber sections 4 and 5 and portion 3b of section 3 each have a uniform substantially circular cross-section of diameter $d$. The mixing chamber section 3, 4 and 5 are respectively connected to each other in a conventional manner to define an inlet end and an outlet end, e.g., bolted to each other via flanges 7, and the resulting over-all shape of the mixing chamber 1 is that of an inverted U. As will be seen, the over-all shape of the mixing chamber of a gas-mixer according to this invention may vary and the inverted U-shape of this particular embodiment is an example of the flexible design available in instances where availability of space is a factor.

The nozzle assembly 2 is connected to the inlet end of section 3 and is arranged to deliver a first gas via gas inlet pipe 9 and a second gas via gas inlet ducts 10 and 10a into the mixing chamber 1. It can be appreciated that the nozzle assembly 2 is connected to a gas delivery duct network which originates at the various sources for the gases and one such typical connection is shown wherein gas inlet duct 10 is connected to delivery duct 11 via flanges 12. The nozzle assembly 2 is illustrated in an enlarged perspective view in greater detail in FIG. 3.

Figure 3:
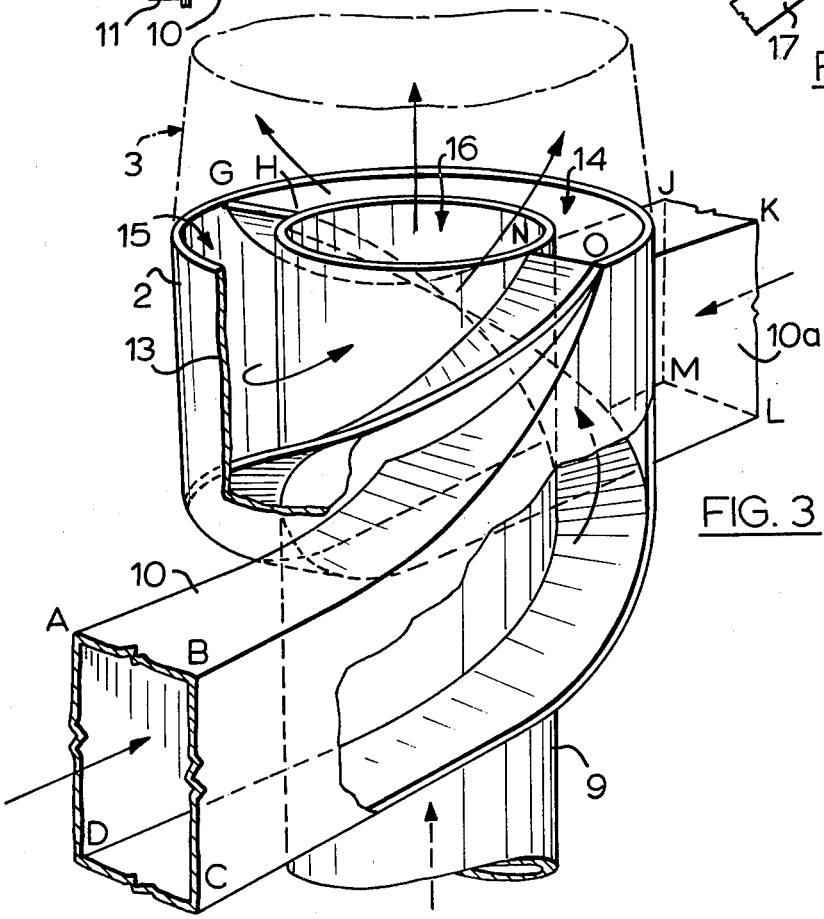
FIG. 3 is an enlarged perspective view, partly broken away, of the gas delivery nozzle assembly.

Referring to FIG. 3, the nozzle assembly 2 comprises a housing 13 which cooperates with the inlet pipe 9 and the inlet ducts 10 and 10a to define three orifices, generally indicated by reference numerals 14, 15 and 16, interior of the nozzle assembly 2, from which the first and second gases issue freely into the inlet section 3 of the mixing chamber in a predetermined directional relationship. It can be seen that the inlet ducts 10 and 10a end in orifices 14 and 15 respectively while inlet pipe 9 ends in orifice 16. Furthermore, the housing 13 cooperates with the inlet pipe 9 and the inlet ducts 10 and 10a to define three channels interior of the nozzle assembly 2 which are arranged to impart an axial flow to the first gas and a spiralling flow to the second gas such that the spiralling flow of the second gas is tangential to the axial flow and at an angle thereto in the direction thereof. More specifically, the inlet pipe 9 is axially aligned with the inlet section 3 of the mixing chamber 1 (see FIG. 1) and advantageously has a circular cross-section substantially smaller than that of the inlet end of section 3 of the mixing chamber. Accordingly, the first gas flowing in inlet pipe 9 will issue from the orifice 16 into the mixing chamber 1 in an axial stream. The inlet duct 10 in this particular embodiment is advantageously of rectangular cross-section ABCD and approaches the inlet pipe 9 tangentially and the bottom portion DC is wrapped peripherally around the inlet pipe 9 to form a ramp DCGH. Similarly, the inlet duct 10a is advantageously of rectangular cross-section JKLM approaching the inlet pipe 9 tangentially and the bottom portion LM is wrapped peripherally around the inlet pipe 9 to form a ramp LMNO. It is noted that the inlet ducts 10 and 10a approach the inlet pipe 9 from opposite directions on opposite sides of the pipe. The remaining walls of the inlet ducts 10 and 10a cooperate with the inlet pipe 9 and housing 13 such that the second gas, flowing in each of the inlet ducts 10 and 10a, flows into the concentric cavity between the inlet pipe 9 and the housing 13 and is there redirected by the ramps DCGH and LMNO. Thus, the second gas flowing in the inlet duct 10 is deflected upwards by ramp DCGH while being contained on the topside by ramp LMNO and on the sides by the exterior surface of the inlet pipe 9 and the interior surface of the housing 13. Similarly, the second gas flowing in the inlet duct 10a is deflected upwards by the ramp LMNO and is contained on the topside by the ramp DCGH. It can be readily appreciated that the net effect of the above described gas assembly configuration is that the second gas will issue from orifices 14 and 15 in spiralling streams which are tangential to the axial stream of the first gas and at an angle thereto in the direction thereof.

Figure 2:
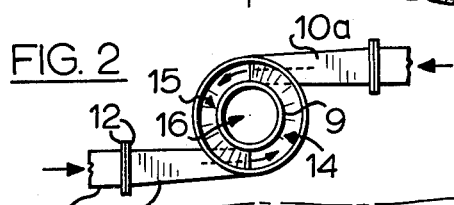
FIG. 2 is a cross-sectional view of the gas delivery nozzle assembly taken through line 2—2 of FIG. 1.
Figure 4:
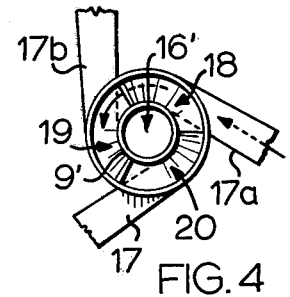
FIG. 4 is a view similar to FIG. 2 but showing an alternate gas delivery nozzle assembly configuration.

The second gas may be delivered into the mixing chamber 1 in more than two spiralling streams. FIG. 2, which shows a cross-sectional view of the gas delivery nozzle assembly 2 taken through line 2—2 of FIG. 1, may thus be compared with an alternative arrangement of gas inlet ducts shown in FIG. 4 wherein gas inlet ducts 17, 17a and 17b deliver a second gas to orifices 18, 19 and 20 respectively. The ducts 17, 17a and 17b and the orifices 18, 19 and 20 are substantially equiangularly spaced around the periphery of the gas inlet pipe 9' to eliminate "dead spots" which, for example, would occur if only one gas inlet duct was provided. In such an event, i.e., only one gas inlet duct, the flow in the duct would tend to be directionally unstable causing the mixing to periodically occur at or near the mixing chamber surfaces with the resultant occurrence of build-up.

It can be seen that the gas mixer according to this invention comprises a mixing chamber wherein the combined flow is characterized by an axial flow of a first gas surrounded by a spiralling flow of a second gas. The particular sublimation application referred to hereinbefore advantageously comprises additional features and these are discussed in detail below, reference being made to typical gas mixer parameters.

Referring to FIG. 1, the portion 3a of the inlet section 3 is advantageously convergent to accelerate the first and second gas streams. The purpose of this first accelerating section is to reduce over-all pressure losses across the gas mixer. Advantageously, a second accelerating section, in the form of a convergent portion 21 may be provided at the end of the exhaust section 5. The purpose of the second accelerating section is to accelerate the combined flow of solid and gas in the exhaust section 5 to a carrying velocity sufficient to transport the solid more quickly to a baghouse or the like via a carrying duct.

The parameters and design features of the gas mixer illustrated in FIG. 1 are now described in relation to a particular application wherein arsenic trioxide ($As_2O_3$) is sublimated. The inlet pipe 9 is supplied from a suitable source with ambient air and the ambient air is injected into the mixing chamber 1 in an axial stream. The inlet ducts 10 and 10a are supplied from a suitable source with a hot gas at a temperature of approximately 650° F. containing arsenic trioxide in gaseous form and the hot gas is injected into the mixing chamber in two spiralling streams which surround the ambient axial stream of air. Typically, the hot gas contains 0.58% arsenic trioxide by volume when supplied to the mixing chamber.

Referring to FIG. 1 several reference points are identified on the gas mixer to describe the mixing process reference is made to Stations P, Q and R. The gas streams entering the mixing chamber at Station P are first accelerated in the convergent portion 3a and the combined gas flow travels upwardly until Station Q is reached; a distance of three mixing chamber diameters $d$ ($3d$). In this portion of the mixing chamber the gases mix in a shear layer. The shear layer commences around the periphery of orifice 16 of the inlet pipe 9 and spreads out towards the inner walls of the mixing chamber. The shear layer also spreads in towards the center of the mixing chamber and, as a result, the bulk of solid forms within the shear layers, and build up of solid at or near the inner wall surfaces is prevented. At Station Q, the combined gas flow enters the middle Section 4 having a long radius 180° bend such that the outer radius of the bend is equal to at least 1.5d and the inner radius of the bend is equal to at least 0.5d. The 180° bend in the middle Section 4 enhances the mixing process by generating secondary swirling. By about three diameters downstream from Station R the mixing is substantially complete and about 99.5% of arsenic trioxide contained in the hot gas is a solid.

The percentage of arsenic trioxide removed from the hot gas stream is a function of the resulting temperature obtained with the first and second gas streams being thoroughly mixed and the figure of 99.5% is predicated on a hot gas at 650° F. containing 0.58% arsenic trioxide by volume being mixed with ambient air to obtain a resulting temperature of 225° F. As the temperature of the ambient air may vary considerably, in order to obtain this high percent solidification it is necessary to volumetrically control its flow to maintain a resulting temperature in the order of 225° F. Downstream of Station R the mixing of the gases is substantially complete and most of the solid is formed. This portion of the mixing chamber, i.e., exhaust section 5, is advantageously substantially vertically aligned to ensure that the combined flow of gas and solid is in a downward direction. As a consequence, build up of solid is prevented and the solid arsenic trioxide, which is notoriously difficult to handle, falls into the second accelerating section 21 where the combined flow is accelerated to a carrying velocity sufficient to quickly carry the solid, via suitable ducting, to a baghouse or the like.

The solidification of arsenic trioxide may, of course, be attained by mixing the gases to any resulting temperature which is below the dew point temperature of the gaseous arsenic trioxide, it being noted that the lower the resulting temperature the greater the amount of solidified arsenic trioxide. The only constraint on maximizing the solidification is cost. It should also be noted that higher solidification temperatures may be limited by the solid collecting equipment such as a bag filter in the baghouse. The design of the gas mixer according to this invention is largely empirical. However, a guide to operational effectiveness may be obtained by scale model tests. For example empirical design shows that a mixing chamber length of approximately 7 mixing chamber diameters was required for the specific arsenic trioxide application and scale model tests were performed to establish the actual effectiveness of the mixing. Brine and water were used to represent the cold and hot gases respectively and these fluids were mixed in a U-shaped tube according to the principles of this invention. It was determined that mixing in the order of 95% could be obtained after the 180° bend (i.e., at Station R) and full scale operation in sublimating arsenic trioxide confirmed these experimental results. Insofar as a straight length of duct is concerned, experimental results showed that mixing in the order of 98% could be obtained for a duct having a length of 7 duct diameters. It was also experimentally determined that pressure drops in the order of 1.2 initial total velocity heads could be expected.

As discussed, the relatively cold air is injected axially at the center of the mixing chamber which produces two beneficial results. Firstly, the denser gas stream is at the center of a swirling flow and mixing is enhanced because this arrangement is less stable than an arrangement where the denser gas is on the outside. Secondly, the hot gas is at the wall of the mixing chamber which is externally insulated, such as by insulation 22 (see FIG. 1). The temperature of the mixing chamber wall is thus maintained and should the central axial stream become unstable and impinge on the mixing chamber wall, cold spots are substantially avoided and build up of the solid at the cold spots is prevented. On the other hand, solidification of arsenic trioxide may be attained by reversing the above arrangement of the gases, i.e., injecting the relatively cold air spirally and the hot gas axially. This latter arrangement of gases, however, results in poorer mixing with a greater risk of solid build up on the inner chamber walls.

There also exists a risk of build up of solid on certain surfaces in the gas delivery nozzle assembly. In the particular embodiment illustrated in FIGS. 1, 2 and 3, the ductwork carrying the hot gas meets the ductwork carrying the cold gas at a common physical boundary interior of the gas delivery nozzle assembly. Thus a solid may form and build up at the boundary because the hot gas in contact with the boundary may be sufficiently cooled so that a solid is generated. Advantageously, therefore, electrical heating of this boundary to a temperature above the dew point of the hot gas will eliminate build up. An example of one such boundary is the end portion of the gas inlet pipe 9.

The following example illustrates the present invention used for the solidification of arsenic trioxide obtained from a roasting operation.

Roaster off-gas obtained from the roasting of a gold bearing arsino pyrite ore, hereinafter referred to as the hot gas, containing $SO_2$, $As_2O_3$, $SO_3$, $N_2$, $O_2$ and $H_2O$, at 700° F. was passed through an electrostatic precipitator to remove the gold bearing dust. The concentration of $As_2O_3$ in the hot gas was in the order of 0.58% by volume and the $As_2O_3$ was in a vapour state (at this concentration the $As_2O_3$ vapourized at above 400° F.). The hot gas was subsequently passed via suitable ductwork to the gas inlet ducts of the gas delivery nozzle assembly of the gas mixer described heretofore with reference to FIGS. 1, 2 and 3 of the drawings at a flow rate of approximately 7000 ACFM. Ambient air was introduced into ductwork leading to the gas inlet pipe of the gas delivery nozzle assembly of the gas mixer described heretofore with reference to FIGS. 1, 2 and 3, by creating a pressure of −2 inches water column in the ductwork. The hot gas and the ambient air were mixed in the mixing chamber of the gas mixer as aforedescribed, i.e., the hot gas was injected into the mixing chamber in two spiralling streams and the ambient air was injected into the mixing chamber in an axial stream such that the ambient stream was surrounded by the spiralling hot gas streams, and a resulting temperature in the mixture of 225° F. was obtained. The flow of the ambient air was automatically controlled by a damper in the gas inlet pipe to ensure a resulting temperature in the mixture of in the order of 225° F.

The mixed gases and the $As_2O_3$ solids formed were ducted to a bag filter where the solid $As_2O_3$ was removed with in the order of 99% efficiency. Not all of the gaseous arsenic trioxide in the hot gas, however, was solidified and the final mixture of gases therefore contained some gaseous arsenic trioxide. Measurements indicated that residual concentrations of gaseous arsenic trioxide were in the order of 0.5% of original concentrations, indicating that 99.5% of the original gaseous arsenic trioxide was solidified. Direct measurement of the degree of actual mixing could not be obtained due to physical constraints in the operating plant and the difficulty of testing a parameter of this nature except in the laboratory. It was clear, however, that the figure of 99.5% arsenic trioxide solidification suggests that the maximum possible mixing efficiency in the mixing chamber was achieved.

It is to be noted that the measured operating pressure drop across the gas mixer was in the order of between 0.3 and 0.4 inches of water column at design conditions.

What I claim is:

1. A gas mixer wherein a first gas is mixed with a second gas to obtain a solid by sublimation or by chemical reaction of the first and second gases comprising a mixing chamber being a duct having an inlet end and an outlet end and a substantially circular cross-section, said duct having a straight inlet section, a substantially 180° bend middle section and a straight exhaust section, said sections being respectively so connected to each other that the mixing chamber has an inverted U-shape such that the inlet section is substantially vertically upwardly aligned and the exhaust section is substantially vertically downwardly aligned, so that the combined flow of gas and solid therein is in a downward direction, a gas delivery nozzle assembly connected to the inlet end of the mixing chamber and comprising a nozzle means axially aligned with the mixing chamber and adapted to deliver the first gas in an axial stream into the mixing chamber, said nozzle means having a substantially circular cross-section and a cross-sectional area substantially smaller than that of the inlet end of the mixing chamber, and at least two gas inlet ducts substantially equiangularly spaced around the periphery of the nozzle means and adapted to deliver the second gas in spiralling gas streams into the mixing chamber tangentially to the axial stream and at an angle thereto and in the direction thereof.

2. A gas mixer according to claim 1 wherein the mixing chamber comprises a duct having a length equal to in the order of seven diameters of the duct.

3. A gas mixer according to claim 1 wherein the inlet section of the mixing chamber has a length equal to in the order of three duct diameters and wherein the middle section has a large radius 180° bend.

4. A gas mixer according to claim 3 wherein the inlet section has a first convergent accelerating portion and the exhaust section has a second convergent accelerating portion.

5. A method of generating a solid by sublimation or by chemical reaction comprising mixing a first gas and a second gas in a mixing chamber of substantially circular cross-section and being a duct having an inlet end and an outlet end, said duct having a straight inlet section, a substantially 180° bend middle section and a straight exhaust section, said sections being respectively so connected to each other that the mixing chamber has an inverted U-shape such that the inlet section is substantially vertically upwardly aligned and the exhaust section is substantially vertically downwardly aligned, so that the combined flow of gas and solid therein is in a downward direction, said mixing being effected by passing the first gas through a nozzle means of substantially circular cross-section and into the inlet end of the chamber in a centrally located and axial stream, directing the second gas into the inlet end of the chamber through at least two inlet means substantially equiangularly spaced around the periphery of the nozzle in at least two separate spiralling streams, each said spiralling stream being tangential to the axial stream and at an angle thereto and in the direction thereof; said gases becoming mixed in the chamber whereby the solid is generated; directing said generated solid carried by the combined flow of the gases to the outlet end of the chamber, and collecting said generated solid.

6. A method as claimed in claim 5 wherein the first gas is ambient air and the second gas is a relatively hotter gas containing gaseous arsenic trioxide; and wherein the flow of the first gas is volumetrically controlled to obtain a resulting temperature of in the order of 225° F. when the gases are thoroughly mixed.

7. A method as claimed in claim 5 wherein the first gas is a hot gas containing gaseous arsenic trioxide and the second gas is relatively colder ambient air; and wherein the flow of the second gas is volumetrically controlled to obtain a resulting temperature of in the order of 225° F. when the gases are thoroughly mixed.

8. A method as claimed in claim 5 wherein the flow of the gases is accelerated in the vicinity of the inlet end of the chamber and wherein the combined flow is accelerated in the vicinity of the outlet end of the chamber.

* * * * *